April 11, 1967 T. JANKOVICH 3,313,951

STEPWAVE GENERATOR

Original Filed Oct. 5, 1962 3 Sheets-Sheet 1

INVENTOR
TIBOR JANKOVICH

BY Darus, Haskell & Levine
ATTORNEYS

STEPWAVE GENERATOR

Original Filed Oct. 5, 1962

INVENTOR
TIBOR JANKOVICH

BY *Darby, Haskell & Levine*
ATTORNEYS

April 11, 1967 T. JANKOVICH 3,313,951
STEPWAVE GENERATOR
Original Filed Oct. 5, 1962 3 Sheets-Sheet 3

INVENTOR
TIBOR JANKOVICH

BY

Paris, Haskell & Levine
ATTORNEYS

United States Patent Office 3,313,951

Patented Apr. 11, 1967

3,313,951
STEPWAVE GENERATOR

Tibor Jankovich, Jenkintown, Pa., assignor, by mesne assignments, to United Aircraft Corporation, a corporation of Delaware Original application Oct. 5, 1962, Ser. No. 228,622, now Patent No. 3,218,630, dated Nov. 16, 1965. Divided and this application Oct. 11, 1963, Ser. No. 315,541
4 Claims. (Cl. 307—88.5)

This application is a division of copending application Ser. No. 228,622, filed Oct. 5, 1962, now Patent No. 3,218,630.

This invention relates generally to digitizers, and more particularly to improvements in analog to digital converters. The invention is particularly concerned with the twofold purpose of increasing the speed of converting analog signals to digital pulse form, and decreasing the number of electronic components necessary for this function. The former advantage of reducing the time of conversion increasingly has become more necessary as data handling problems have become more complex in communication and computer applications, whereas the latter advantage of reducing the number of components in the circuit is believed self-evident in the light of the ever mounting complexity of electronic circuits as evidenced by the so-called giant computers now in common usage.

To perform these functions, there is provided a novel manner of successively comparing the analog signal by each order of the digital number, and diminishing this analog signal by each order of the digital number that is contained therein. These successive comparing and diminishing functions are performed by the use of novel circuits having a minimum number of components and being capable of speeds in excess of microseconds. Among these circuits is a step function generator that operates in an avalanching manner to automatically produce a succession of different voltage levels corresponding in amplitude to the different orders of the digital number. The fixed voltage levels being produced by this avalanching generator are each compared with the analog signal, and, if contained therein, are employed to sucessively diminish this signal thereby to convert the analog signal into a digital form.

It is accordingly a principal object of the invention to provide a digitizer having fewer components and capable of higher speeds of operation.

A further object is to provide an avalanching digitizer that is adapted to be triggered into operation by an impulse and thereafter to automatically and rapidly convert an analog signal into digital form.

Another object is to provide an improved avalanching step wave generator for such converter.

A further object is to provide an improved clock generator for such converter.

A still further object is to provide a completely solid state digitizer comprised of improved circuitry capable of operation in time intervals measured in nanoseconds.

Figure 1:
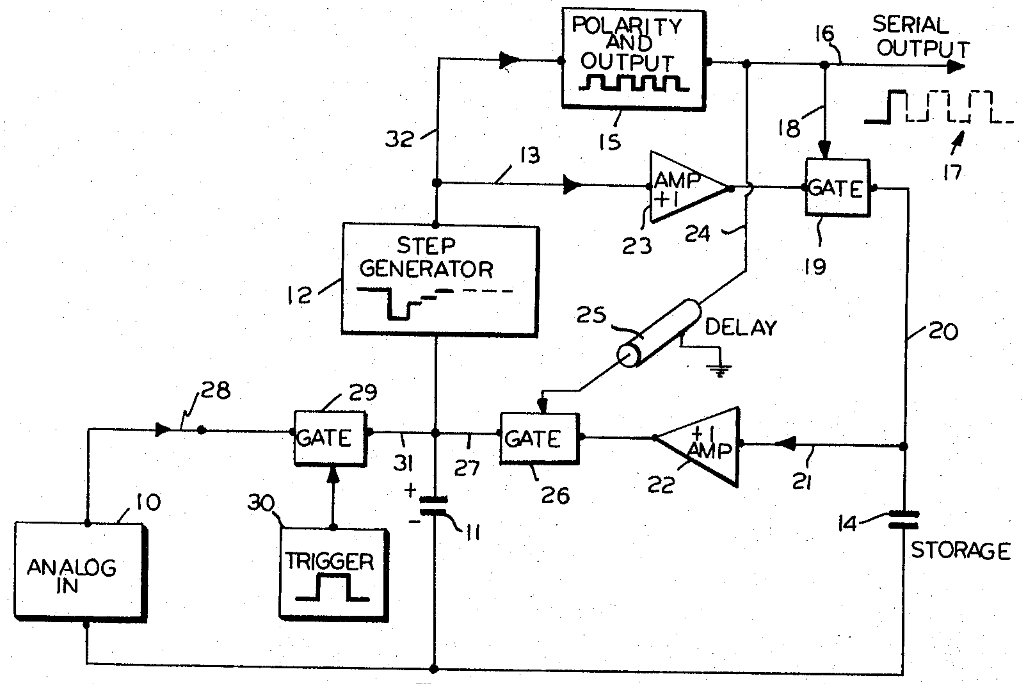
Figure 2:
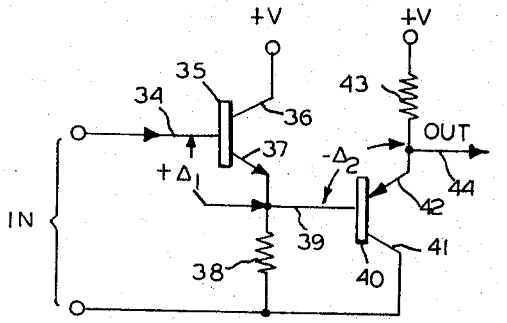
Figure 3:
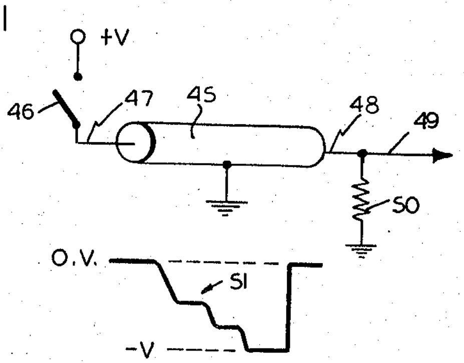
Figure 4:
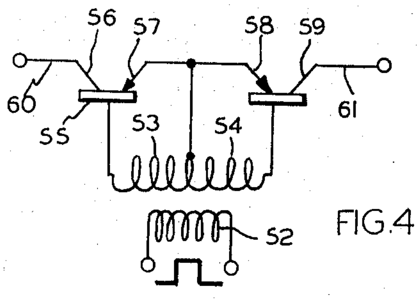
Figure 5:
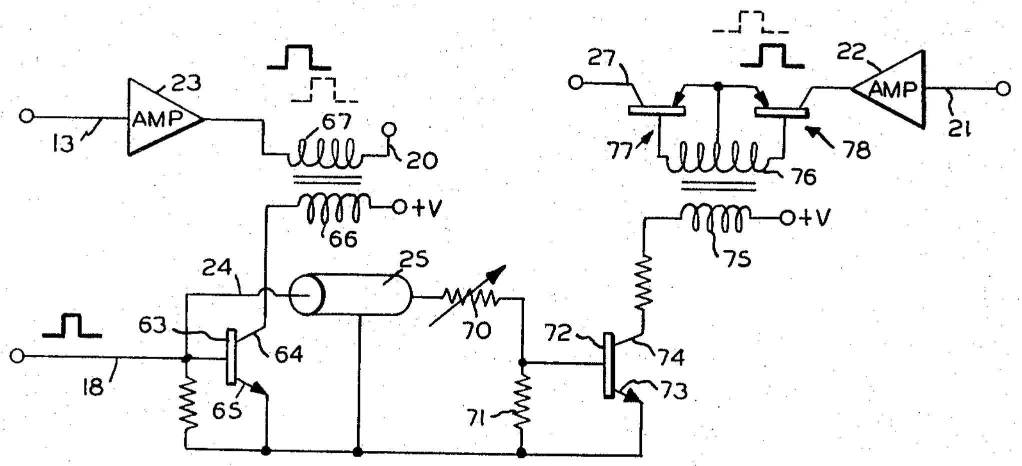
Figure 6:
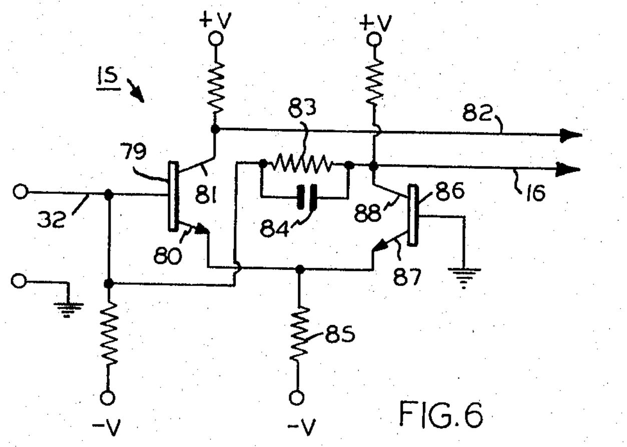
Figure 7:
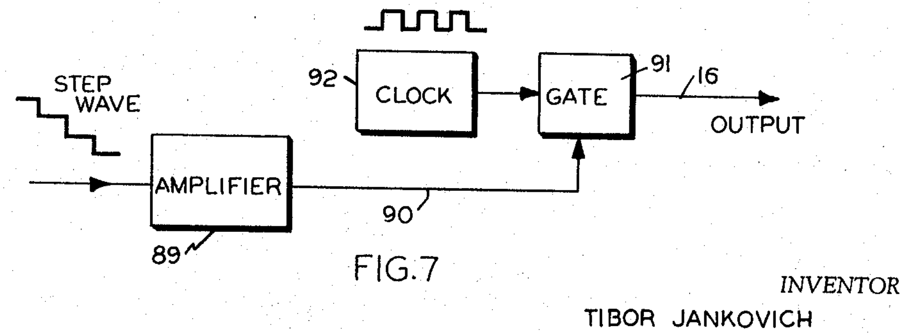
Figure 8:
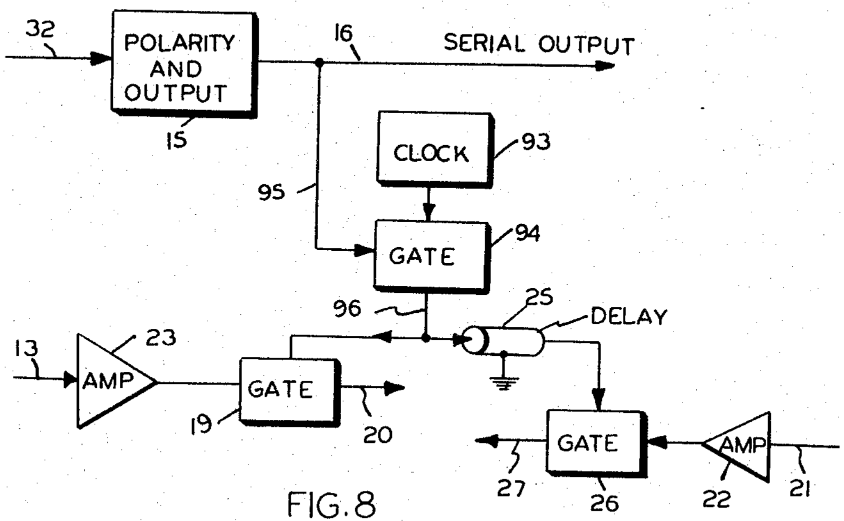
Figures 9, 10:
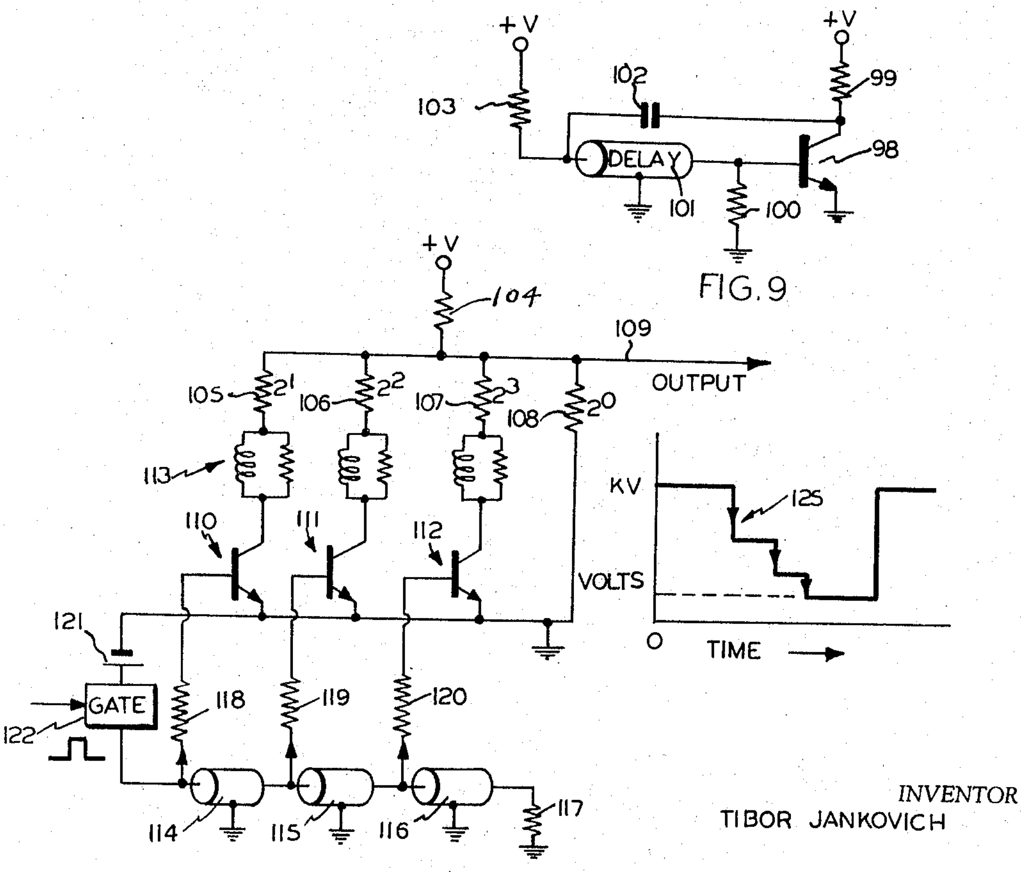

Other objects and additional advantages will be more readily understood by those skilled in the art after a detailed consideration of the following specification taken with the accompanying drawings, wherein:

FIG. 1 is an electrical block diagram illustrating a preferred embodiment of the invention, FIG. 2 is an electrical schematic drawing of one preferred errorless amplifier for the embodiment of FIG. 1, FIG. 3 illustrates a preferred step wave generator circuit that may be employed in FIG. 1, FIG. 4 illustrates a preferred gate circuit that may be employed in the system of FIG. 1, FIG. 5 illustrates a preferred combination of time delay circuitry for sequentially operating the gate circuits of FIG. 1, FIG. 6 illustrates a preferred polarity responsive pulsing circuit that may be employed in FIG. 1, FIG. 7 illustrates in block diagram form, an alternative manner of producing output pulses, FIG. 8 illustrates in block diagram form an alternative manner of sequentially operating the gate circuits of FIG. 1, FIG. 9 is an electrical schematic illustration of a preferred clock generator circuit, and FIG. 10 is an electrical schematic illustration of an alternative avalanching step wave generator that may be employed in the system of FIG. 1.

Referring now to the drawings, there is shown in FIG. 1 a block diagram of a preferred system according to the invention wherein an analog signal introduced at 10 is very rapidly and automatically converted into a binary coded digital pulse train 17 appearing over output line 16, with the presence or absence of pulses in each position of the output pulse train indicating whether or not that binary order is contained in the analog signal. Thus, for example, if a first pulse appears in its proper position in the output train 17, it indicates that the highest order of the binary number is contained in the analog signal, and, in a four order conversion system, this would be the number 8 or $2^3$. Similarly, if a second pulse next occurs in its proper position in the output pulse train, this indicates that the number 4 or $2^2$ is contained in the analog signal, and similarly, if the third and fourth pulses occur in proper sequence in the output pulse train, it is known that the number 2 or $2^1$, and the number 1 or $2^0$, respectively, are both contained in the analog signal. Consequently, if all four pulses appear in the output pulse train, it is known that the analog signal equals the number 15. Similarly, if one or more of these pulses is absent from the output pulse train, it is known that that order of the binary number is not contained in the analog signal.

Referring to FIG. 1, the input analog signal at 10 is directed to a normally open gate circuit 29 leading to a capacitor 11, whereby when the gate circuit is momentarily closed in response to a triggering pulse from trigger 30, to commence operation of the system, the input analog signal is stored in the capacitor 11. Simultaneously with the closing of gate 29, a step wave generator 12 is triggered into operation to automatically produce a negative step wave consisting of a rapid succession of different negative level voltages, with each different voltage level being produced by the generator 12 corresponding to a different order of the binary number.

The generator 12 is connected in series circuit relationship with the capacitor 11 and therefore the difference between each negative voltage level being produced by the generator 12 and the voltage appearing on capacitor 11 successively appears at the lines 32 and 13 leading from the opposite terminal of generator 12.

The first voltage level being produced by generator 12 is at its lowest negative amplitude, corresponding to the highest order of the binary number, and as this voltage is produced, the difference voltage on lines 32 and 13 will be positive or negative depending upon whether this highest order of the binary number is contained within the analog signal on capacitor 11. If this voltage level of generator 12 is lower in amplitude than the stored signal on capacitor 11, indicating that the highest order of the binary number is contained within the analog signal, then the voltage on line 32 is positive, and this positive voltage actuates a polarity sensitive pulsing circuit 15 to produce an output pulse on output line 16. If on the other hand, the voltage on line 32 is negative, it is known that the highest order of the binary number is not contained within the analog signal, and the pulsing circuit 15 does not respond to a negative voltage to produce the first pulse on the serial output line 16.

The output pulse appearing on line 16 is also directed downwardly over line 18 to momentarily operate a gate circuit 19 which permits the positive difference voltage appearing on line 13 to pass through a one-way amplifier circuit 23 and through the closed gate 19 and over line 20 to charge a storage capacitor 14. Thus after the first comparison between the step wave generator voltage level and the analog signal on capacitor 11, a voltage is stored on storage capacitor 14 proportional to the difference between the analog signal and the first voltage level of the step wave generator.

This first output pulse produced over serial output line 16 is additionally directed downwardly over line 24 and through a time delay line 25 to operate a gate circuit 26 shortly after the difference voltage has been stored on the capacitor 14. Operation of the gate 26 interconnects the storage capacitor 14 and the input capacitor 11 in such manner that the input capacitor 11 is permitted to discharge the original analog signal stored thereon and to become charged with the first difference signal that has been temporarily stored on storage capacitor 14. This is performed by providing in the circuit interconnecting the capacitor 11 and the storage capacitor 14, an amplifier circuit 22 having a very low output impedance being connected to the capacitor 11 and a very high input impedance being connected to the storage capacitor 14. Consequently, when the gate circuit 26 is operated, the storage capacitor 11 discharges its analog signal backwardly through the gate 26 and through the low output impedance of the amplifier. Simultaneously therewith, the storage capacitor 14 energizes the amplifier 22 with the first difference voltage therein which in turn is directed through the one-way amplifier 22 to charge the input capacitor 11 with the difference signal.

As a result of the above described sequence of operations, there is provided on the input capacitor 11 after the first comparison step has been completed, a voltage charge proportional to the difference between the original analog input signal and the lowest level of the step generator.

In the event that the lowest level of the step generator signal 12 is greater in amplitude than the original input signal, no output pulse is produced on serial output line 16 and consequently neither the gate 19 nor the gate 26 is operated, so that after the first comparison step has been made, the signal remaining on input capacitor 11 is the same original analog input signal as before. Thus, in the first step of operation, the analog input signal is compared with a voltage corresponding to the highest order of the binary number and in the event that the highest order of the binary number is contained within the analog signal, an output pulse is produced over serial output line 16. In this case, the analog input signal is also reduced by the amount of the highest order of the binary number to produce a first difference signal on the input capacitor 11.

In the second step of operation, the step wave generator 12 then produces its next voltage level corresponding to the next succeeding order of the binary number, and this is compared with the signal on capacitor 11 in the same manner as before to produce a second difference voltage on lines 13 and 32 leading from the opposite terminal of the generator 12. If the second voltage is also positive indicating that the second order of the binary number is also contained within the analog signal, the polarity responsive circuit 15 is again operated to produce a second pulse over the serial output line 16. Additionally, the gates 19 and 22 are again operated in time sequence to first store the second difference voltage on line 13 on the storage capacitor 14 and thereafter to transfer this second difference voltage back to the capacitor 11 in preparation for the next succeeding comparison step.

In this same identical fashion, each succeeding voltage level being produced by the step generator 12 is successively compared with the remaining analog signal on capacitor 11 and a succession of output pulses are produced over serial output line 16 comprising the binary coded equivalent of the analog signal.

According to the invention, the preferred system is capable of extremely rapid operation within time intervals measured in nanoseconds ($10^{-3}$ microseconds or $10^{-9}$ seconds), and preferably performs its conversion steps in a completely automatic or avalanching manner. By use of the term "avalanching," is meant the fact that only one external pulse from trigger circuit 30 is required to initiate operation of the converter, and thereafter all of these successive sequence of operations are performed automatically. These results are obtained by the use of an automatically operating step generator to produce an avalanching succession of different voltage levels, and by the use of improved transistor circuits for the gates, amplifiers, and polarity circuit as described hereinafter.

FIG. 3 illustrates one preferred form of an avalanching step wave generator according to the invention. As shown, this generator comprises merely a delay line 45, an output impedance resistor 49 and an input switch or gate 46. In this circuit, the output resistance 49 is deliberately mismatched from the characteristic impedance of the delay line 45 whereby as the delay line 45 is pulsed by a very short duration impulse, there is produced a series of reversible reflections of the pulse of decreasing amplitude to produce the desired step wave. More specifically, the gate 46, illustrated in FIG. 3 as a simple switch, is closed and very rapidly opened to produce a very short duration impulse over the input line 47. This pulse passes through the delay line 45 to momentarily reproduce the pulse level at the output line 48 as the highest level signal in the waveform shown. Since the output resistance 49 is not the same as the characteristic impedance of delay line 45, a reflection then occurs at the output passing the wave backwardly through the delay line but at a different voltage level due to the resistance losses in resistor 49. Upon reaching the input line 47, the wave observes an open switch 46 and is again reflected through the delay line 45. In actual operation it has been observed that a multilevel step wave can be produced as shown in the waveform below FIG. 3, having a succession of reflections that very closely approximate a binary weighted step wave as is desired. To obtain a negative step wave as employed in FIG. 1, it is merely necessary to reverse the polarity of the input pulse energizing the delay line 45 by connecting the free terminal of gate 46 to a negative voltage source.

FIG. 10 shows an alternative avalanching step wave producing circuit employing a series of delay line sections 114, 115, and 116, as shown. In this embodiment, there is provided a resistance divider ladder network, comprising resistors 104 and 108 permanently connected in a potentiometer circuit. The highest level voltage produced occurs when only resistors 104 and 108 are in the circuit. A series of additional resistors 105, 106, and 107 are provided in parallel with resistor 108 in the network, but are normally connected in the network through open switches being provided by transistors 110, 111, and 112, respectively.

To obtain the next lower level step wave, the transistor 110 is triggered into conducting position by applying positive potential to its base electrode. This places the resistor 105 in shunt with the resistor 108 to reduce the potential on output line 109 to its next lower level. Similarly, as the transistors 111 and 112 are successively made conducting, the resistors 106 and 107 are successively placed in shunt with resistor 108 to decrease the voltage drop in steps as shown in the waveform of FIG. 9.

To obtain the avalanching effect and to produce the step wave 105 much more rapidly at the speed desired, a series of delay line sections 114, 115, and 116 are connected in cascade and are terminated by resistor 117 having the same resistance as the characteristic impedances of the line. The input to the first of the delay line sections 115 is then pulsed by means of applying a source of potential 121 thereto very rapidly by means of the gate circuit, and this pulse passes through the delay line sections 114, 115, and 116 in time sequence. As it enters the first delay line section 114, the pulse passes upwardly through resistor 118 to trigger the transistor 110 into operation thereby inserting the resistor 105 in shunt with resistor 108 and dropping the voltage level at the output line 109 to the next step level. A very short time later the pulse emerges from the first delay line section 114 and thence passes through resistor 119 to trigger the second transistor 111 into conduction, thereby inserting the next succeeding resistor 116 in shunt with resistor 108. Similarly, after passing through the second delay line section 115, the pulse next energizes the third transistor gate circuit 112 through resistor 120 and places the remaining resistor 107 in shunt with resistor 108. In this manner, an extremely accurate step wave, that is binary weighted as desired, can be generated to automatically produce a succession of different voltage levels over the output line 109 as is desired.

In the same fashion as in the circuit of FIG. 3, it will be noted that only a single pulse for operating the gate circuit 122 is required, and thereafter the circuit of FIG. 9 automatically or in an avalanching manner produces a succession of different voltage level signals over line 109 that may be employed in the circuit of FIG. 1. To reverse the polarity of the voltage levels on output line 109 and produce a diminishing negative step wave the resistor 104 may be energized by a negative source of potential rather than a positive source as shown.

When operating this step wave circuit of FIG. 10, at the high speeds desired, it is found that switching transients occur and each level of the step wave being produced does not have the square edges in the waveform as shown. To compensate for these transients, there is provided a separate wave shaper network, indicated at 113, in series with each of the transistors 110, 111, and 112. These networks may be comprised of a parallel connected inductance and resistance, as shown. It has been found that by providing these networks 113 and suitably selecting their resistance and inductance values, depending upon the circuit configuration, the length of the leads and the like, the step level waveform produced may be shaped in substantially the square waveform edges as desired. It has also been noted, that by providing the network resistances as variable resistors, individual adjustment of the square waveform at each voltage level can be obtained to compensate for the interelectrode capacities, conductor capacities, and other impedances that are found to differ for each channel of the potentiometer network.

FIG. 4 illustrates one preferred gate circuit that may be employed in the system of FIG. 1 to supply the gating functions indicated as gate 19, gate 26, and gate 29. As shown, this gating circuit comprises a pair of oppositely connected transistors with the emitter collector electrodes thereof being connected in series arrangement as shown, with the emitter electrode 57 of the first transistor being connected to the emitter electrode 58 of the second transistor. The input line to the gate may be provided to either collector electrode over either line 60 or 61 and the output taken from the other collector since the transistors are connected back-to-back as shown. For triggering the gate into operation, there is provided a transformer including a primary winding 52 and a secondary winding that is center tapped to provide sections 53 and 54. As the primary winding 52 of the transformer is energized by a pulse, the secondary windings produce pulses across the base to emitter electrodes of both transistors to render the transistors momentarily conducting during the duration of the pulse. When the pulse is removed, the transistors are again opened to deenergize the gate circuit.

FIG. 2 illustrates one preferred transistor circuit that may be employed for the amplifiers 22 and 23 of FIG. 1. As shown, the circuit preferably comprises a first transistor 35 of one conductivity type, being connected as an emitter-follower type stage, feeding the base electrode of a second transistor 40 of an opposite conductivity type. The input signal to this amplifier is directed over line 34 to the base electrode of the first transistor 35 and the output signal from the circuit is taken from the emitter electrode 42 and directed over output line 44. In the emitter-follower stage, the output voltage taken from the emitter electrode of the transistor 35 and directed over line 39 will normally not be accurately the same as the input voltage on line 34 due to the voltage drop appearing across the base to emitter electrodes, and labeled in the drawing as $\Delta_1$. However, by providing the second transistor 40 of an opposite conductivity type there is provided an additional voltage drop from the base to the emitter electrode thereof, labeled $-\Delta_2$. The voltage across the output line 39 is obtained between the base to collector electrodes of the second transistor 40. However, since the output voltage taken over line 44 includes this voltage on line 39, and, in addition, it includes the voltage drop $\Delta_2$ occurring from the base to the emitter 42 of the second transistor 40, the first error $\Delta_1$ may be made equal to the second error $\Delta_2$ thereby cancelling out the error, and reproducing at the output line 44, an identical voltage to that received over the input line 34 of the amplifier. Additionally, the input impedance to the emitter-follower stage is very high to prevent loading and the output impedance is much lower as is desired for amplifier 22.

FIG. 5 illustrates a preferred circuit that may be employed for the gate circuit 19, the delay line 25, and the gate circuit 26 of FIG. 1. As shown, the output pulse being directed over line 18 is passed to the base electrode of a switching transistor 63 connected in series with the primary winding 66 of a gate circuit similar to that shown in FIG. 4. This pulse, therefore, actuates this gate circuit to permit the difference voltage over line 13 to be passed through the amplifier 23 and outwardly over line 20 to the storage capacitor (not shown in this figure but shown in FIG. 1). This pulse over line 18 is also directed over line 24 to a delay line 25 that is terminated by a variable resistor 70 and a fixed resistor 71. At a fixed time interval after the occurrence of the pulse over line 18, a pulse appears across resistor 71 to energize the base electrode of transistor 72, which in turn actuates a gate circuit similar to that of FIG. 4. This latter gate circuit, is connected in series with the amplifier 22, as shown in FIG. 1, thereby to enable the transfer of the charge from the storage capacitor 14 to the input capacitor 11 as is shown in FIG. 1.

FIG. 6 illustrates one preferred circuit for the polarity and output circuit of FIG. 1. As shown this circuit is essentially a one-shot or monostable multivibrator that responds only to a positive signal at its input line 32 to produce a positive impulse over output line 16. This one-shot circuit comprises a pair of transistors 79 and 86 interconnected differentially with a common biasing resistor 85. The base electrode of transistor 86 is grounded to normally render transistor 86 conductive and produce a voltage drop across resistor 85 in a direction to normally render transistor 79 nonconductive. Upon a positive signal being received over input line 32, the transistor 79 is made conducting and the voltage drop across resistor 85 turns off transistor 86 thereby raising the potential at its collector and producing a positive pulse over output line 16. This positive pulse is also fed back through the capacitive resistive network 83 to the base electrode of transistor 79 thereby maintaining transistor 79 conducting and transistor 86 nonconducting for a short time interval. During this interval the capacitor of network 83 becomes charged in such direction as to progressively reduce the potential at the base of transistor 79 and when this potential is reduced below the negative biasing on this transistor 79, the circuit abruptly flips, or returns to its original stable condition with transistor 86 conducting and transistor 79 nonconducting. The positive output pulse on line 16 is thus abruptly terminated after a predetermined interval.

As an alternative to the use of the polarity circuit of FIG. 6, the output pulses may be produced by a repetitively operating clock generator 92 as shown in FIG. 7. In this embodiment, each difference voltage between the analog signal and the step wave generator is applied to a buffer amplifier 89 that energizes a gate circuit 91. If the difference voltage is positive, the gate 91 is closed permitting the clock generator 92 to pass a pulse over output line 16. If the difference voltage is negative, the gate 91 is not operated and a clock pulse is not produced over the output line 16.

As an alternative to the circuit of FIG. 1, wherein the polarity and output circuit 15 directly actuates the gate 19 and thereafter directly actuates the gate 26 through a delay line 25, it may be desired to perform these functions by the use of a clock generator 93 and gate circuit 94 as shown in FIG. 8. In this modification, the polarity and output circuit produces its positive output pulses over output line 16, as before, but instead of directly actuating the gates 19 and 26, energizes a gate circuit 94. Each such energization of the gate 94, momentarily closes the gate 94 and permits a uniform pulse from the clock generator 93 to pass therethrough. This uniform clock pulse is applied over line 96 to directly operate the gate circuit 19 and is also applied to the delay line 25 to operate the gate circuit 26 after a preset time delay.

FIG. 9 illustrates one preferred form of clock generator according to the invention, and compatibly with the other preferred circuits, employing a minimum number of components. In operation, the initial application of voltage to this circuit at the resistors 99 and 103 triggers the transistor 98 into conduction drawing current between the collector emitter electrodes and reducing the voltage potential at the collector electrode. This produces a negative going pulse in feedback through capacitor 102 to the input of delay line 101 which after a preset short time delay emerges and reaches the base electrode to render the transistor 98 nonconducting thereby raising the potential at the collector electrode thereof. The positive pulse at the collector is again fed back through capacitor 102 and the delay line 101 such that after the same preset delay it positively energizes the base electrode to again turn the transistor 98 on or conducting. In this same repetitive manner, the transistor 98 is successively turned on and off to produce the desired clock impulses.

Although but limited numbers of embodiments of the invention has been illustrated and described, it is believed evident that many variations may be made by those skilled in the art without departing from the spirit and scope of this invention. Accordingly this invention should be considered as being limited only by the following claims appended hereto.

What is claimed is:

1. A compensated stepwave generator producing a series of sharp edge impulses of different potential levels in time sequence with the different levels being nonuniformly spaced from one another according to a binary progression:

a resistor network including a series resistor and a plurality of parallel arranged resistors, of progressively increasing resistance according to a binary progression, a high speed switch means for each parallel resistor for selectively interconnecting its associated resistor to the series resistor, and a transmissive network having a series of terminals, each being time delayed from the next when the network is energized by an initiating impulse, means interconnecting the different terminals of the network to actuate the different ones of the switches, and means for compensating the waveform produced across the series resistance against switching transients.

2. In the generator of claim 1, said compensating means comprising a reactive network in circuit with each of the parallel arranged resistors.

3. In the generator of claim 1, said transmissive network comprising a wound inductive delay line.

4. A compensated stepwave generator for producing a binary weighted stepwave comprising:

a series resistance and a plurality of parallel arranged resistances of unequal value according to a binary progression with all of said parallel arranged resistances selectively connectable in common to one terminal of the series resistance, a transistor switch in series with each of the parallel arranged resistors, a waveform compensating network in circuit with each parallel resistance and its associated switch, a multiple output terminal delay line being energizable by an initiating pulse, and means coupling different ones of the output terminals of the delay line to actuate different ones of the transistor switches.

References Cited by the Examiner

UNITED STATES PATENTS

| | | | |
|---|---|---|---|
| 2,750,510 | 6/1956 | Moore et al. | 331—111 |
| 2,871,378 | 1/1959 | Lohman | 307—88.5 |
| 2,871,453 | 1/1959 | Bradley | 333—20 |
| 2,923,898 | 2/1960 | Goad | 333—29 |
| 3,003,121 | 10/1961 | Hileman | 331—111 |
| 3,031,583 | 4/1962 | Murphy | 307—88.5 |
| 3,050,636 | 8/1962 | Sommerfield | 307—88.5 |
| 3,056,049 | 9/1962 | Baird | 307—88.5 |
| 3,080,489 | 3/1963 | White | 307—88.5 |
| 3,100,876 | 8/1963 | Schulz | 330—17 |
| 3,114,112 | 12/1963 | Cochran | 330—17 |
| 3,121,807 | 2/1964 | Stephens | 307—88.5 |
| 3,124,707 | 3/1964 | Thomasson | 307—88.5 |
| 3,171,975 | 3/1965 | Ashley et al. | 307—88.5 |

OTHER REFERENCES

"Pulse Generators," by Glascoe and Lebacqz, Radiation Lab. Series, McGraw-Hill, 1948; pages 177–179 are pertinent.

ARTHUR GAUSS, *Primary Examiner.*

S. D. MILLER, *Assistant Examiner.*